US008676796B2

(12) United States Patent
Kulakow et al.

(10) Patent No.: US 8,676,796 B2
(45) Date of Patent: Mar. 18, 2014

(54) COORDINATED RELATED-SEARCH FEEDBACK THAT ASSISTS SEARCH REFINEMENT

(75) Inventors: Arthur Kulakow, Saratoga, CA (US);
David M. Hogue, San Francisco, CA (US); Jane Wells, New York, NY (US)

(73) Assignee: Carhamm Ltd., LLC, Dover, DE (US)

( * ) Notice: Subject to any disclaimer, the term of this patent is extended or adjusted under 35 U.S.C. 154(b) by 953 days.

(21) Appl. No.: 11/420,191

(22) Filed: May 24, 2006

(65) Prior Publication Data

US 2007/0112759 A1 May 17, 2007

Related U.S. Application Data

(60) Provisional application No. 60/684,817, filed on May 26, 2005.

(51) Int. Cl.
*G06F 17/30* (2006.01)

(52) U.S. Cl.
USPC .......................................... 707/731; 715/277

(58) Field of Classification Search
CPC .............................................. G06F 17/30867
USPC ........... 707/1–5, 765, 749, 758, 731; 715/277
See application file for complete search history.

(56) References Cited

U.S. PATENT DOCUMENTS

| 5,515,488 | A  |     | 5/1996  | Hoppe et al.      |         |
|-----------|----|-----|---------|-------------------|---------|
| 6,256,623 | B1 |     | 7/2001  | Jones             |         |
| 6,636,853 | B1 |     | 10/2003 | Stephens, Jr.     |         |
| 6,751,611 | B2 |     | 6/2004  | Krupin et al.     |         |
| 7,117,199 | B2 |     | 10/2006 | Frank et al.      |         |
| 7,158,966 | B2 |     | 1/2007  | Brill et al.      |         |
| 7,225,187 | B2 |     | 5/2007  | Dumais et al.     |         |
| 7,523,099 | B1 | *   | 4/2009  | Egnor et al. ...................... | 707/3   |
| 2002/0199194 | A1 | * | 12/2002 | Ali ................... | 725/46  |
| 2004/0064447 | A1 | * | 4/2004  | Simske et al. .................... | 707/5   |
| 2005/0131799 | A1 | * | 6/2005  | Clay et al. ........................ | 705/37  |
| 2005/0283473 | A1 | * | 12/2005 | Rousso et al. .................... | 707/5   |
| 2005/0289100 | A1 | * | 12/2005 | Dettinger et al. ................. | 707/1   |
| 2006/0224938 | A1 | * | 10/2006 | Fikes et al. ..................... | 715/500 |
| 2006/0230035 | A1 | * | 10/2006 | Bailey et al. ..................... | 707/5   |
| 2006/0242164 | A1 | * | 10/2006 | Evans et al. .................... | 707/100 |
| 2007/0016469 | A1 | * | 1/2007  | Bae et al. ........................ | 705/14  |

OTHER PUBLICATIONS

Castro, E. HTML for the World Wide Web, Fifth Edition, with XHTML and CSS. Peachpit Press. 2002. ISBN 0-321-13007-3. Chapters 8 and 15.

Chakrabarti, S. et al., "Automatic Resource List Compilation by Analyzing Hperlink Structure and Associated Text," Proc. 7th International World Wide Web Conference (online), 1998 (retrieved Jun. 17, 2007) from http://citeseer.ist.psu.edu/chakrabarti98automatic.html>.

(Continued)

*Primary Examiner* — Rehana Perveen
*Assistant Examiner* — Scott A Waldon
(74) *Attorney, Agent, or Firm* — Brundidge & Stanger, P.C.

(57) ABSTRACT

The present invention relates to displaying coordinated related-search feedback in a single active window, to help a user develop, refine and select a useful search. In particular, it relates to conducting a plurality of related searches and making the results simultaneously available to the user in a coordinated display.

25 Claims, 4 Drawing Sheets

(56) References Cited

OTHER PUBLICATIONS

Howe, A.E., et al., Savvysearch: A MetaSearch Engine that Learns Which Search Engines to Query [online]. AI Magazine, 18(2), 1997 [retrieved Jun. 171, 2007. Retrieved fiom Internet:<URL:http://citeseer.ist.psu.edu/howe97sa~search.html.

Selberg, E., et al, 0. Multi-service search and comparison using the MetaCrawler. In Proceedings of the 4th World Wide Web Conference [online], 1995 [retrieved Jun. 1, 2007 71. Retrieved fiom Internet:<URL:http:Nciteseer.ist.psu.edu/selberg95multiservice. html>.

Zamir, O., et al., Grouper: A Dynamic Clustering Interface to Web Search Results. In Proceeding of the Eighth international Conference on World Wide Web [online], 1999 [retrieved on Jun. 1, 2007 71. pp. 136 1-1374. Retrieved from Internet:<URL:http:Nsosp16.cs. washington.edu~homes/etzioni/papers/www 8.p.

\* cited by examiner

COORDINATED RELATED-SEARCH FEEDBACK THAT ASSISTS SEARCH REFINEMENT

PRIORITY INFORMATION

This application claims the benefit of U.S. Provisional Patent Application No. 60/684,817, entitled "Coordinated Related-Search Feedback that Assists Search Refinement" filed on 26 May 2005 by Mark Silverberg, Art Kulakow, Kevin Wray, David M. Houge and Jennifer Wells. That application is incorporated by reference for all purposes.

RELATED APPLICATION

This application is related to U.S. Pat. No. 7,512,603, issued 31 Mar. 2009, "Responding To End-User Request For Information In A Computer Network", by inventors E. Veteska, David L. Goulden, and Anthony G. Martin, filed on 5 Nov. 2002 and U.S. patent application Ser. No. 10/815,112, "System and Method for Responding to Search Requests in a Computer Network" by inventors Remigiusz Paczkowski, et al., filed on 31 Mar. 2004, now abandoned. The related applications are incorporated by reference.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The copyrighted material includes the source code appendix.

BACKGROUND OF THE INVENTION

The present invention relates to displaying coordinated related-search feedback in a single display, to help a user develop, refine and select a useful search. In particular, it relates to conducting a plurality of related searches and making the results simultaneously available to the user in a coordinated display.

Search engines index various collections. Google, Yahoo, Alta Vista and others index the web. Google desktop, dtSearch, operating system utilities and others index workstations and network drives. Larger and larger document collections are available to search. This taxes both the relevancy ranking performed by the search engines and the search formulation skill of the users.

The larger a collection, the harder it is to search and review search results. In searching technology, the trade-off between search breadth and review time is characterized in terms of recall and precision. A broad search recalls more desired results than a narrow search, but with reduced precision, as the broad search produces many irrelevant results. Thesauruses have been offered to make sure that users don't miss relevant search terms, to increase recall, but larger result sets have reduced precision, requiring more review time. Proximity searches (e.g., Dialog and Lexis) and set operations (e.g., Dialog) enable users to refine searches based on prior results, adjusting both recall and precision. On the search result display side, relevance rankings strategies have been developed to bring results that seem most precisely responsive to the searches to the top of the display list.

An opportunity arises to further improve on technologies that assist users in understanding the results of their searches and refining their inquires. Better, more easily reviewed searches with improved recognition of relevant search results and reduced review time may result.

SUMMARY OF THE INVENTION

The present invention relates to displaying coordinated related-search feedback in a single display, to help a user develop, refine and select a useful search. In particular, it relates to conducting a plurality of related searches and making the results simultaneously available to the user in a coordinated display. Particular aspects of the present invention are described in the claims, specification and drawings.

BRIEF DESCRIPTION OF THE DRAWINGS

FIGS. 1-2 show a side-by-side display, within a single browser window, of two or more related searches. FIG. 3 shows a layered, tab-accessible collection of related searches.

In FIGS. 4-5, middleware presents the user with a search window and coordinated related-search feedback. FIG. 6 depicts adding coordinated related-search feedback capabilities to a search engine.

DETAILED DESCRIPTION

Figure 1:
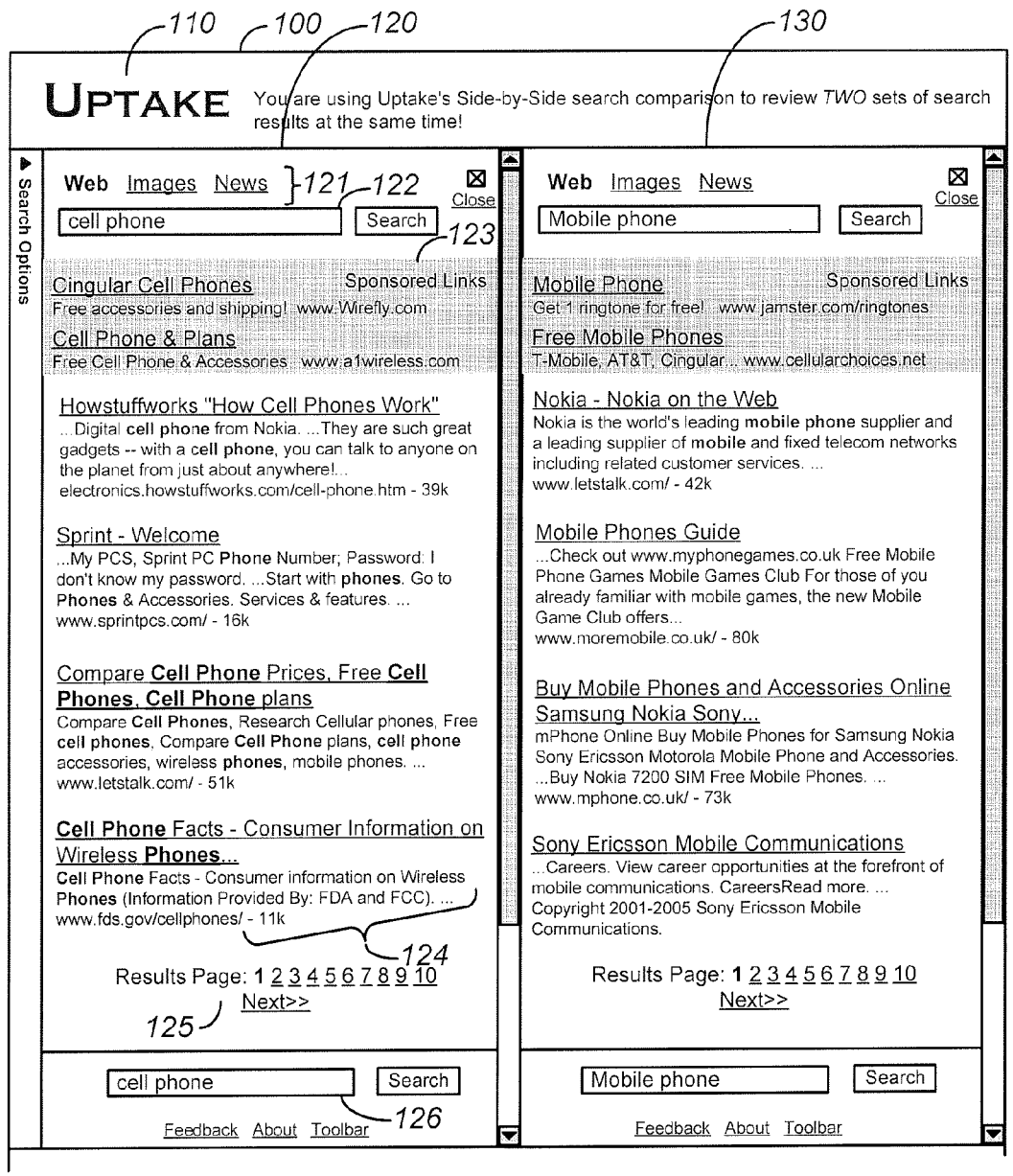
FIGS. 1-3 depict alternative coordinated related-search displays.

The following detailed description is made with reference to the figures. Preferred embodiments are described to illustrate the present invention, not to limit its scope, which is defined by the claims. Those of ordinary skill in the art will recognize a variety of equivalent variations on the description that follows.

Coordinated related-search feedback assists users in refining their searches and in selecting among alternative searches with similar results. Related searches may be user or machine generated. Users generated modified searches when they are not satisfied with their query. Sometimes, users invoke a term thesaurus to broaden the recall of a search, in a search technology-assisted related-search. Other times, the search technology may include a search thesaurus (as opposed to a term thesaurus) that has been configured and trained based on aggregated intelligence of numerous users or advertisers. Either observing users, who are refining their searches, or observing advertisers, who study users'search patterns, there is abundant data from which to construct a search thesaurus and deliver to a user some of the aggregated intelligence of prior searchers. In many ways, users and search technologies combine to generate related searches.

Coordinated related-search feedback provides an orderly presentation of multiple result sets in a single active window. "Single active window" is meant in this context to mean an active window under control of a single instance of an application program, for instance, a single browser instance. This single active window can span multiple monitors or make take less than a whole monitor to display. An orderly presentation can include sizing and positioning of areas in the active window for the related search result sets. It can include giving the user a choice among pre-configured system or user-selected views, or user configured workspaces. Coordinated feedback frees the user of opening multiple browsers instances and then sizing and positioning the browser windows.

Coordinated related-search feedback also can extend to indicating the degree of similarity between the related searches. Emphasis, such as color-coding, highlighting, bullets, flashing or the like, can indicate overlap (or differences) between search result sets. The overlap can be in entire result sets, in the result sets being displayed, or in a selected size of result sets, such as the 10, 20, 50 or 100 most relevant results of a search. Overlapping results may be given a separate display area, effectively creating result sets A, B and A I B, with the intersection corresponding to a one of several alternative meanings of overlap.

Another option is to create a differences set, (A Y B)-(A I B), with coding to indicate which search produced items in the differences set. As with the overlaps set, differences can be in entire result sets, in the result sets being displayed, or in a selected size of result sets, such as the 10, 20, 50 or 100 most relevant results of a search.

Coordinated feedback allows the user to modify one of the related searches while keeping other searches and result sets. If search B seems more promising than search A, the user can refine search A based on learning from the results of search B. Or, vice-versa. A set of related searches, either user generated or search technology suggested, can be tracked and made available to the user for selection. The user can select multiple searches and display the search results or the overlap in or differences between the search results of the selected searches.

Figure 2:
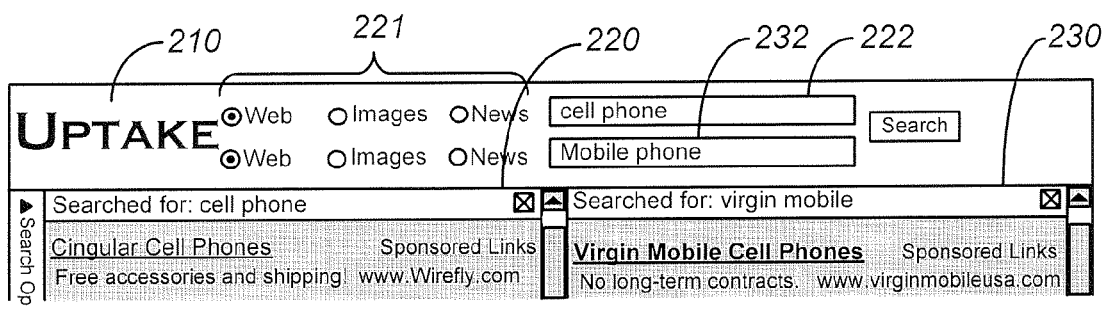
Figure 3:
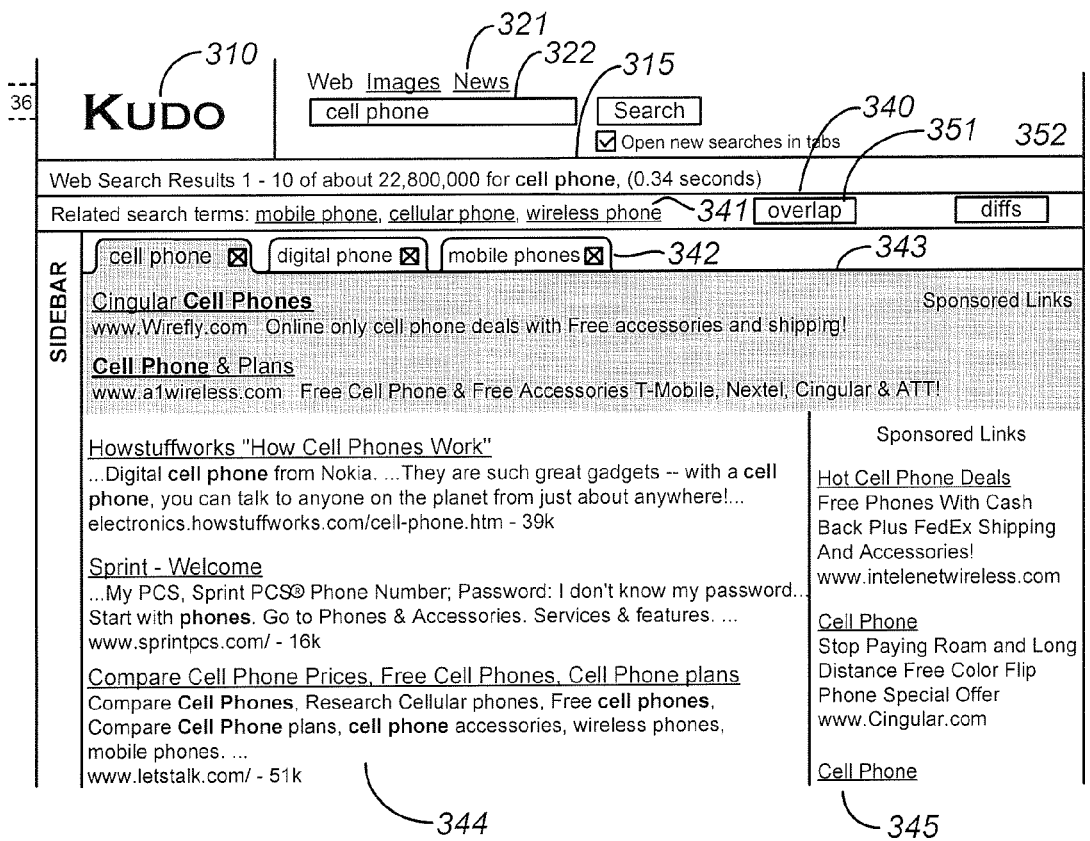

FIGS. 1-3 depict alternative coordinated related-search displays. FIGS. 1-2 show a side-by-side display, within a single active window, of two or more related searches. FIG. 3 shows a layered, tab-accessible collection of related searches.

In FIG. 1, two search results appear side-by-side. The user need not size and position the search results, as they appear in a single coordinated display 100 that may have default, user-selectable view arrangements or user configurable workspace arrangements. These results could, alternatively, be positioned top-and-bottom. In FIG. 1, the single active window 100 includes a title area 110 and two or more search and result areas 120, 130. The search and result areas are similarly organized. Word links 121 support user selection of a search domain. A text entry window 122 and search button support user entry of the search to be displayed below. The text entry window and button may be mirrored 126 at the bottom of the active window, usefully so when a user selects a large number of results (e.g., 100) results for a display page so there is a significant distance between the top and bottom. Sponsored links 123 are included in the active window along with unsponsored search results 124. Navigation aids are provided 125 for reviewing the result set. The active window could include more than two results placed side-by-side. The active window also could include a search overlap and/or differences display area, positioned side-by-side with the search results, above or below the side-by-side results, or selectable by a single user action to replace (or toggle back-and-forth with) the side-by-side display. Alternatively, overlaps and/or differences could be pushed to the top or bottom of the respective lists, segregated within each result set.

Ordering within the search overlap area may be based on ordering of one of the searches or an averaged ordering of the related searches, when a separate search overlap area is provided, either side-by-side (FIG. 1) or layered (FIG. 3). Ordering within a search differences area may be based on orderings of the individual result sets, a metric of relevance or coding the particular results to the result sets by segregating them, either within a result set or in a separate differences area. In general, the coordination of results allows the search technology to help the user learn about the similarities and/or differences in the result sets by coding individual results, either in a separate active window area or in line, supplementing entries in one or more search result areas.

The coordinated related-search display can process the results and code them. The rank of a particular result in each of the related searches optionally can be numerically or graphically indicated, such as 2/15, for second and fifteenth in the related searches, or **/, or indicated by color-coded symbols, such as a red figure and a green figure, either adjacent to each other or concentric. Lines could be used to connect a result that appears in both result sets. For lines extending off-screen, one or more arrowheads could used to indicate how far off-screen the connected result appears.

FIG. 2 depicts alternative positioning of the search domain selection 221 and searches 222, 232 in an area 210 above the result sets 220, 230. Searches positioned in this way remain visible as the user scrolls through the result sets 220, 230.

In FIG. 3, the user toggles among search result sets by selecting a tab 342, much as users select among spreadsheet workbook sheets or among documents open in a word processor. A user can select a tab to display or create an overlap 351 or differences 352 set. FIG. 3 depicts a title area 310 that includes word links to search domains 321 and a search text entry window 322 corresponding to the currently active tab. A results summary area 315 describes the status of the current result set 340. Related search terms can be listed as word links 341, mirroring the tabs 342 and allowing wrapping, in case the tabs 342 extend off-screen, due to the number of related searches in progress. Controls are provided for the user to generate an overlap results set 351 or a differences result set 352. Optionally, the user may be allowed to annotate or rename a tab, to supplement a name assigned by the search technology reflecting the search terms.

Figure 4:
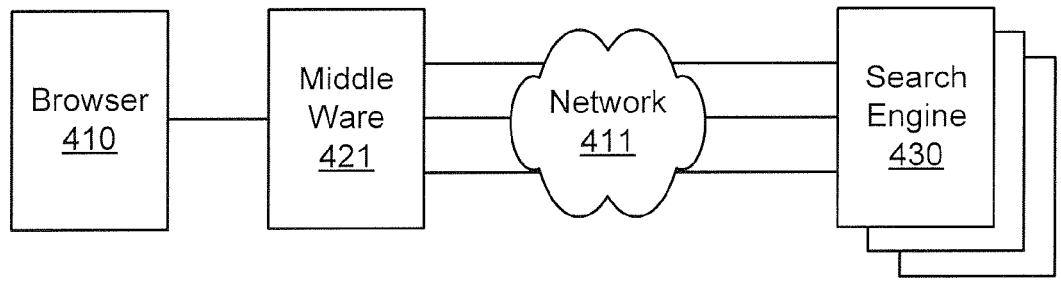
FIGS. 4-6 are high level block diagrams of middleware and search engine implementations of coordinated displays.
Figure 5:
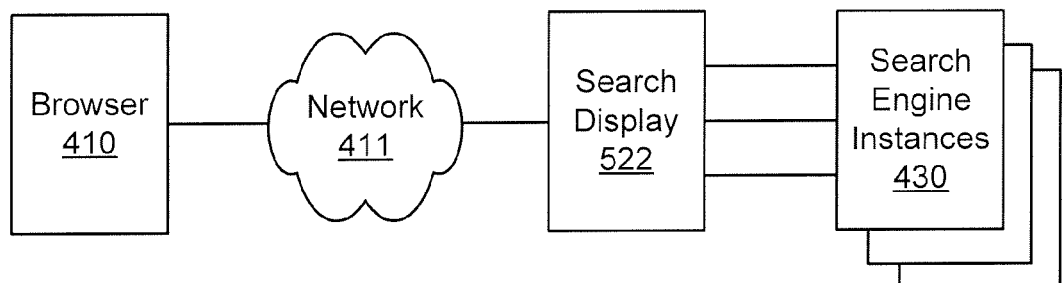
Figure 6:
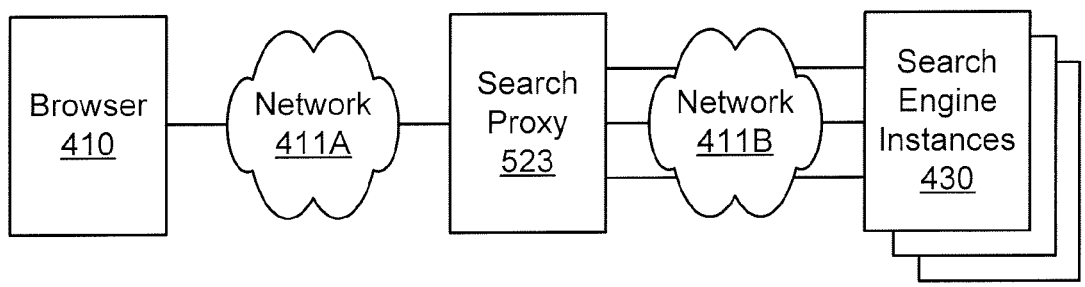

FIGS. 4-6 are high level block diagrams of middleware and search engine implementations of coordinated displays. hi FIGS. 4-5, middleware 421 presents the user with a search window and coordinated related-search feedback. Middleware with a routine resident on the user's system may implemented as a search bar. Middleware resident on a server, such as a proxy server, also may present a search screen 522. In either embodiment, the middleware conducts two or more search sessions with related but different searches and feeds the results into so called side-by-side frames or layering buffers and gives the user the option of toggling among search results of the layered display. The middleware may optionally transmit net active window dimensions to the search engine, in lieu of describing the full browser window dimensions, so that the search engine can populated the result set window in a user-friendly format. The middleware may reserve annotation areas on the active window, so that it can annotate search entries as described above, without varying the displayed content of the search results.

Technically, middleware also could move sponsored links to their own area of the active window (e.g., 343, 344, and 345 in FIG. 3). This would preserve the search engine's advertising revenue, while reasonably allocating active window area. This may be useful, because resizing the width of some search engines' results windows does not narrow the column width allocated to sponsored links; only the result set display is narrowed. This looks awkward when little width is left over after displaying the sponsored links. One who implements ad-shifting technology would need to be cognizant of copyright issues.

In each of FIGS. 4-6, a browser 410, network (411, 411A, and 411B) and search engine instances 430 are depicted. Technical components needed to produce coordinated related-search feedback in a single active window are variously located, on the user's machine, at a search proxy server 523 or as part of the search engine.

FIG. 6 depicts adding coordinated related-search feedback capabilities to a search engine. The search engine conducts two parallel searches and merges the results. A merge component formats the merged results. A hidden field or search URL can be returned with the merged results to conform to HTML conventions for maintaining state information. A user interaction component manages the user interaction and user selections.

Some Particular Embodiments

The present invention may be practiced as a method or device adapted to practice the method. The same method can be viewed from the perspective of the user experience or the technical component that merges multiple search results into a single active window. The invention may be an article of manufacture such as media impressed with logic to carry out coordinated related-search feedback.

One embodiment is a coordinated method of providing related-search feedback to a user that facilitates search refinement. This method includes querying a document database with two or more related searches and displaying two or more result sets including document identifiers and documents snippets from responsive results for the related searches in a single active window. In this context, documents include one or more of files on disk, web pages, images or news articles. Document identifiers may be names of documents or links to the documents. Documents snippets may be summaries or excerpts of text or thumbnails of images.

A further aspect of this embodiment includes accepting a user-defined search, automatically proposing to the user one or more related searches and accepting a user selection among the proposed related searches.

A coordinated display may include displaying two or more result sets side-by-side in the single active window or displaying two or more result sets above-and-below one another.

This embodiment further may include determining overlap between the two or more result sets and visually coding particular results to reflect the overlap. Coding may be applied to the particular results that overlap or to the results that do not overlap. The coding may include one or more of color-coding, highlighting or text animation. Alternatively, coding may be by physical segregation between coded and uncoded results. The coded results may be separated into a separate coded results set and displayed as an additional result set in the single active window. Coded results may be removed from the initial result sets for purposes of display. Alternatively, coded results may be segregated within a result set from uncoded results and moved to the top or bottom of the active window. Overlap may be determined from entire result sets, selected sizes of result sets or from displayed portions of result sets.

Another aspect of this embodiment may include rank coding particular results in a coded result set to indicate the ranking of the particular results in the two or more initial result sets. The ranking may use numbers, symbols or color-coded icons This first method embodiment may be implemented as a computer device running middleware. The device includes memory, a processor coupled to the memory, and logic and resources operative on the processor adapted to communicate two or more related searches, to receive result sets from the search engine and provide the result sets to be displayed according to the embodiments of aspects of embodiments described above.

Alternatively, the implementing device may be a search engine device. This device includes memory, a processor coupled to the memory, and logic and resources operative on the processor adapted to receive two or more related searches from a particular user, compose a coordinated display of results from the related searches and provide the coordinated display of result sets to the particular user to be displayed in accordance with the embodiments and aspects of embodiments described above.

The embodiments described above may be modified to provide layered, coordinated related-search feedback in a single active window. This modified embodiment displays results set selectors that allow a user to select in a single user action a result set to display. Displaying includes displaying document identifiers and snippets from a plurality of responsive results, generally as described above. Again, the method embodiment may be practiced as a computer device running middleware, the middleware resident on the user's machine or a proxy server, or as a technical component of a search engine.

While the present invention is disclosed by reference to the preferred embodiments and examples detailed above, it is understood that these examples are intended in an illustrative rather than in a limiting sense. Computer-assisted processing is implicated in the described embodiments. Accordingly, the present invention may be embodied in methods of providing coordinated related-search feedback in a single active window, systems including logic and resources to provide coordinated related-search feedback in a single active window, systems that take advantage of computer-assisted coordinated related-search feedback in a single active window media impressed with logic to provide coordinated related-search feedback in a single active window data streams impressed with logic to provide coordinated related-search feedback in a single active window or computer-accessible services that provide coordinated related-search feedback in a single active window. It is contemplated that modifications and combinations will readily occur to those skilled in the art, which modifications and combinations will be within the spirit of the invention and the scope of the following claims.

We claimed as follows:

1. A method, comprising:
   receiving a user input that includes a search domain selected from a plurality of search domains;
   querying a document database of the selected search domain with a first search based on first search terms as a first attempt to obtain desired information;
   querying the document database of the selected search domain with a second search based on second search terms as a second attempt to obtain the desired information,
      wherein the first and second search terms comprise different search terms;
   displaying, in a single active window, two or more results sets that include the selected search domain, the search terms used, document identifiers and document snippets from responsive results for the first and second searches;
   determining overlap between the two or more results sets; and
   visually coding particular results of the two or more result sets to reflect the overlap;
      wherein the particular results of the two or more result sets are displayed in a second display area in the single active window that is separate from a first display area in the single active window in which the two or more results sets are displayed.

2. The method of claim 1, further comprising:
accepting a user-defined search;
automatically proposing to the user one or more related searches based on search terms of the user-defined search and a search thesaurus; and
accepting a user selection among the related searches.

3. The method of claim 1, further comprising accepting at least two user-defined searches to use when querying.

4. The method of claim 1, further comprising displaying the two or more result sets side-by-side in the single active window.

5. The method of claim 1, further comprising displaying the two or more result sets above-and-below in the single active window.

6. The method of claim 1,
wherein the coding comprises displaying the particular results of the two or more result sets with visual emphasis to indicate overlapping, and
wherein the visual emphasis includes color coding, highlighting, bullets, flashing, or a combination thereof.

7. The method of claim 6,
wherein the coding comprises displaying results from the two or more result sets that do not overlap with visual emphasis to indicate non-overlapping, and
wherein the visual emphasis includes color coding, highlighting, bullets, flashing, or a combination thereof.

8. The method of claim 6, further comprising coding by physical segregation between the coded particular results and the uncoded results.

9. The method of claim 8, further comprising segregating the coded particular results into a separate coded result set and displaying the coded result set in the single active window.

10. The method of claim 9, further comprising removing the coded particular results from displayed results of the two or more result sets.

11. The method of claim 9, further comprising rank coding the particular results in the coded result set to indicate the ranking of the particular results in the two or more result sets.

12. The method of claim 11, wherein the rank coding uses numbers.

13. The method of claim 11, wherein the rank coding uses symbols.

14. The method of claim 11, wherein the rank coding uses color-coded icons.

15. The method of claim 8, further comprising segregating the coded particular results within the displayed results of the two or more result sets.

16. The method of claim 6, further comprising determining the overlap from subsets of the displayed results of the two or more result sets.

17. The method of claim 6, further comprising determining the overlap from predetermined-size subsets of the two or more result sets.

18. A computer device, comprising:
a memory;
a processor coupled to the memory;
a search engine for searching a document database;
middleware logic and resources operative on the processor configured to:
present a graphical interface for receiving a selection of a search domain from a plurality of search domains and for receiving two or more related searches in the selected search domain, wherein each related search comprises different search terms and each related search attempts to locate the same desired information in the selected search domain;
communicate the two or more related searches to the search engine;
receive two or more related-search result sets from the search engine;
coordinate the two or more related-search result sets to be displayed in a single active window, wherein the display comprises the two or more related-search result sets, including the selected search domain, the search terms used, document identifiers and document snippets from responsive results for the related searches;
determine an overlap between the two or more related-search result sets; and
visually code particular results of the two or more related-search result sets to reflect the overlap;
wherein the particular results of the two or more related-search result sets are displayed in a second display area in the single active window that is separate from a first display area in the single active window in which the two or more results sets are displayed.

19. A computer device, comprising:
a memory;
a processor coupled to the memory;
a search engine configured to:
query a document database of a search domain with a first search based on first search terms as a first attempt to obtain desired information, and
query the document database of the search domain with a second search based on second search terms as a second attempt to obtain the desired information;
logic and resources operative on the processor configured to:
receive an indication of the search domain and the first and second searches from a particular user, wherein the first and second search terms comprise different search terms and the first and second searches attempts to locate the same desired information in the search domain;
conduct the first and second searches by the search engine to generate two or more result sets;
compose a coordinated display of the two or more result sets from the first and second searches;
provide the coordinated display of the two or more result sets to the particular user to be displayed in a single active window, wherein the display comprises the two or more result sets, including the search domain, the first and second search terms, document identifiers, and document snippets from responsive results for the first and second searches;
determine an overlap between the two or more result sets; and
visually code particular results of the two or more result sets to reflect the overlap;
wherein the particular results of the two or more result sets are displayed in a second display area in the single active window that is separate from a first display area in the single active window in which the two or more result sets are displayed.

20. A computer device, comprising:
a memory;
a processor coupled to the memory;
a search engine for searching a document database;
logic and resources operative on the processor configured to:

receive two or more related searches from a particular user, wherein each related search comprises different search terms and each related search attempts to locate the same desired information, and wherein one search of the two or more related searches is based on a second search of the two or more related searches and a search thesaurus, and the search thesaurus is based on aggregated information from a plurality of advertisers;

conduct the two or more related searches by the search engine to generate two or more result sets;

identify particular results from the two or more result sets that overlap;

compose a coordinated display of the two or more result sets from the two or more related searches;

provide the coordinated display of the two or more result sets to the particular user to be displayed; and visually code the particular results from the two or more result sets that overlap to reflect overlapping by color coding, highlighting, bullets, flashing, or a combination thereof;

wherein the particular results are displayed in a second display area in a single active window that is separate from a first display area in the single active window in which the two or more result sets are displayed.

21. A method, comprising:

querying a document database with two or more related searches, wherein each related search comprises different search terms and each related search attempts to locate the desired information;

displaying result set selectors that allow a user to select a result set from two or more result sets from the two or more related searches to display in a first active window; and displaying, in the first active window, the selected result set, including document identifiers and document snippets from a plurality of responsive results of the selected result set, and options to display overlap and difference among the two or more result sets.

22. The method of claim 21, further comprising determining overlap between the two or more result sets and visually coding particular results to reflect the overlap.

23. The method of claim 22, further comprising:

segregating the coded results into a separate coded result set and displaying the coded result set in the single active window; and rank coding particular results in the coded result set to indicate the ranking of the particular results in the two or more result sets.

24. A computer device, comprising:

a memory;

a processor coupled to the memory;

a search engine for searching a document database;

middleware logic and resources coupled to the processor configured to:

communicate two or more related searches to the search engine, wherein each related search comprises different search terms and each of the related searches attempts to locate the same desired information, one search of the two or more related searches being based on a second search of the two or more related searches and a search thesaurus, the search thesaurus based on aggregated information from a plurality of advertisers;

receive result sets from the search engine;

code results from the two or more related searches that overlap or differ with visual emphasis;

segregate the coded results into a separate coded result set; and provide the result sets to be displayed in a single active window, the display depicting a rank of the coded results with the coded results displayed in an order according to the rank.

25. A computer device, comprising:

a memory;

a processor coupled to the memory;

a search engine for searching a document database;

middleware logic and resources coupled to the processor configured to:

receive two or more related searches from a particular user, wherein each related search comprises different search terms and each of the related searches attempts to locate the same desired information, and wherein one search of the two or more related searches is based on a second search of the two or more related searches and a search thesaurus, and the search thesaurus is based on aggregated information from a plurality of advertisers;

compose a coordinated display of result sets from the two or more related searches;

code results from the two or more related searches that overlap or differ with visual emphasis;

segregate the coded results into a separate coded result set; and provide the coordinated display of result sets to the particular user to be displayed in a single active window, the display depicting a rank of the coded results with the coded results displayed in an order according to the rank.

* * * * *